June 12, 1962 P. M. HONNELL ET AL 3,038,660

ELECTRIC SYNTHESIZER OF MATHEMATICAL MATRIX EQUATIONS

Filed July 7, 1955 4 Sheets-Sheet 1

INVENTORS

Pierre Marcel Honnell
Robert Edwin Horn

INVENTORS
Pierre Marcel Honnell
Robert Edwin Horn

INVENTORS
Pierre Marcel Honnell
Robert Edwin Horn

INVENTORS
Pierre Marcel Honnell
Robert Edwin Horn

United States Patent Office 3,038,660

Patented June 12, 1962

3,038,660

ELECTRIC SYNTHESIZER OF MATHEMATICAL MATRIX EQUATIONS

Pierre Marcel Honnell, University City, and Robert Edwin Horn, St. Louis, Mo., assignors to Washington University, St. Louis, Mo.

Filed July 7, 1955, Ser. No. 520,517
9 Claims. (Cl. 235—180)

Figure 1:
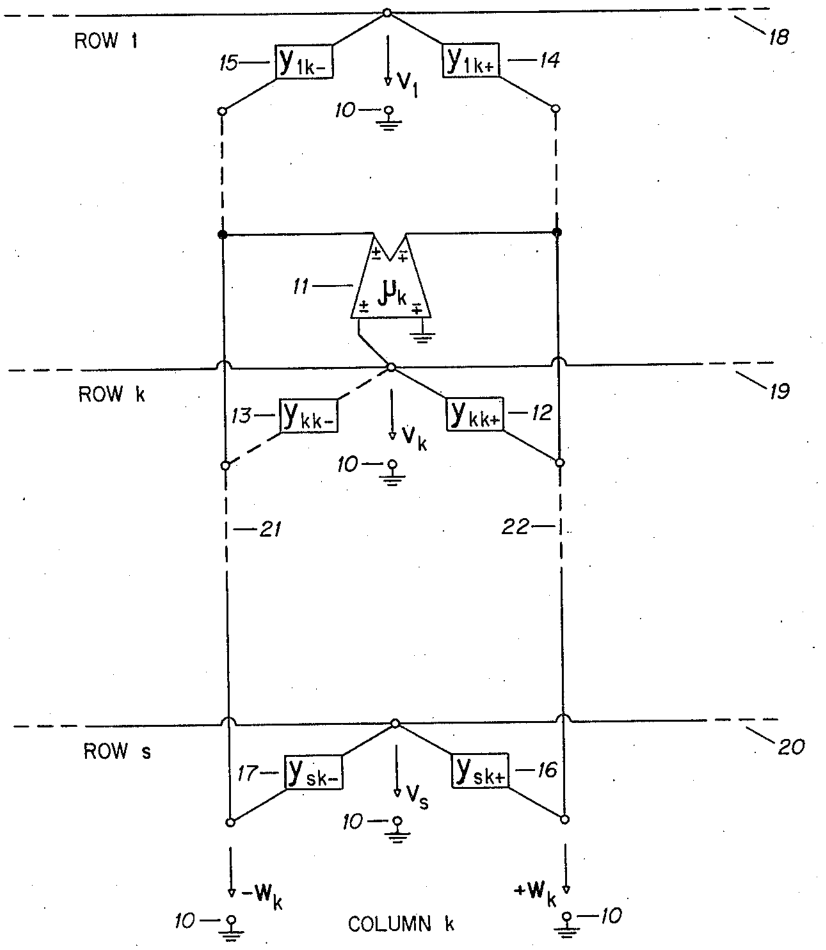

This invention relates to a method and means for the electric synthesis of mathematical matrix equations, yielding electric networks for the solution of mathematical matrix problems, such as algebraic and integro-differential equations, and the simulation of systems represented by such matrix equations.

The object of this invention is the synthesis of electric networks abstractly analogous to mathematical matrix equations, in which each entry of the mathematical matrix is represented by one and only one electric network element or subnetwork, and the vectors in the matrix equations are represented by electric variables. This method yields a physical embodiment whose topological structure is homeomorphic to the ordering of the mathematical matrix entries. The method is so general that it permits the synthesis of electric networks corresponding to arbitrary, asymmetric, non-square matrices with arbitrary distribution of zero entries.

A special feature of the invention is the establishment in the physical embodiment, when desired, of a topological structure of the synthesis network which is isomorphic to the mathematical matrix array, whether rectangular or square.

The present invention is based upon principles distinctly antithetic to those of the existing and prior art, for the present invention makes no applications of methods such as those described in current terminology by the phrases: "solving for the highest derivative," "assuming the highest derivatives are available and integrating," "summing at differentiator inputs," or "summing at integrator inputs."

The present invention also does not depend upon means currently described in the literature as "summing amplifiers," "differentiating amplifiers," "integrating amplifiers," "operational amplifiers," nor upon "RC time-constants," for its physical embodiment.

Instead, the method of the present invention involves the unique establishment of a 1-to-1 reciprocal correspondence between the mathematical matrix equations and the synthesized electric network which features the independent correspondence between individual entries in the mathematical matrix equations and individual subnetworks of the synthesized network. This is accomplished by an ensemble of basic synthesis networks, such that the ensemble of these synthesis networks corresponds to the mathematical matrix equation in its entirety.

Figure 2:
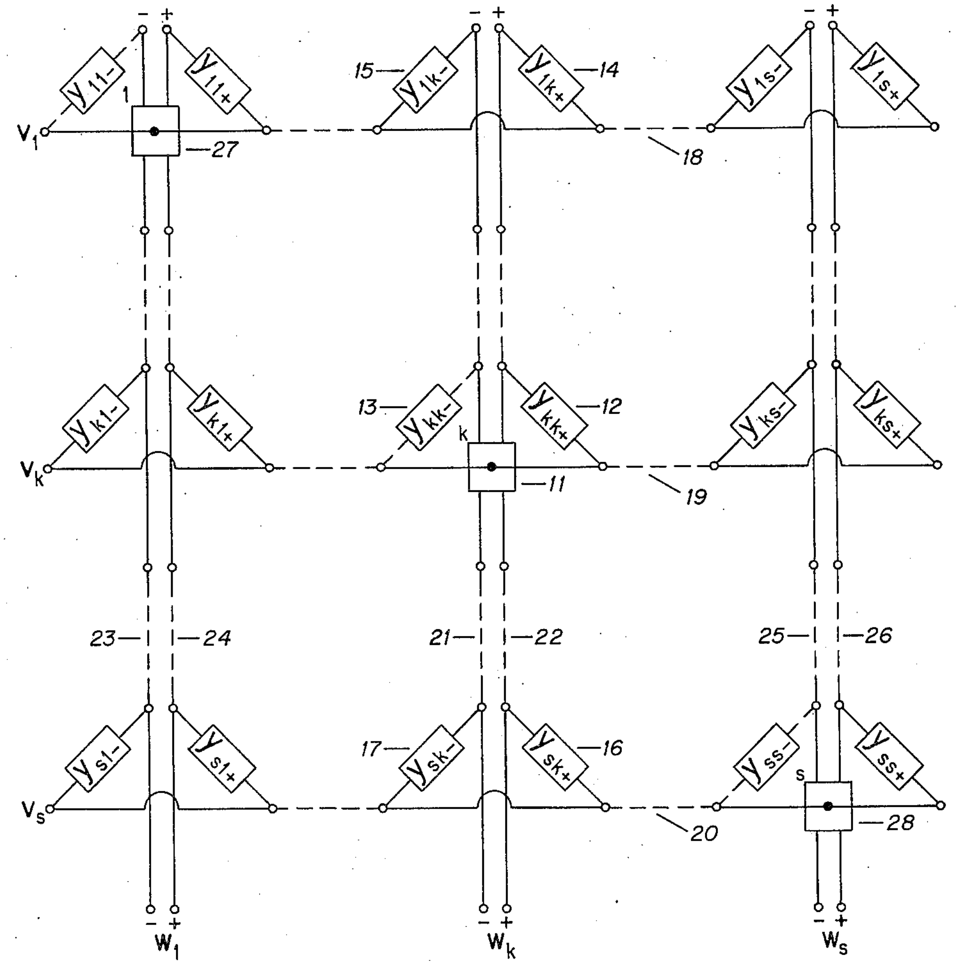
Figure 3:
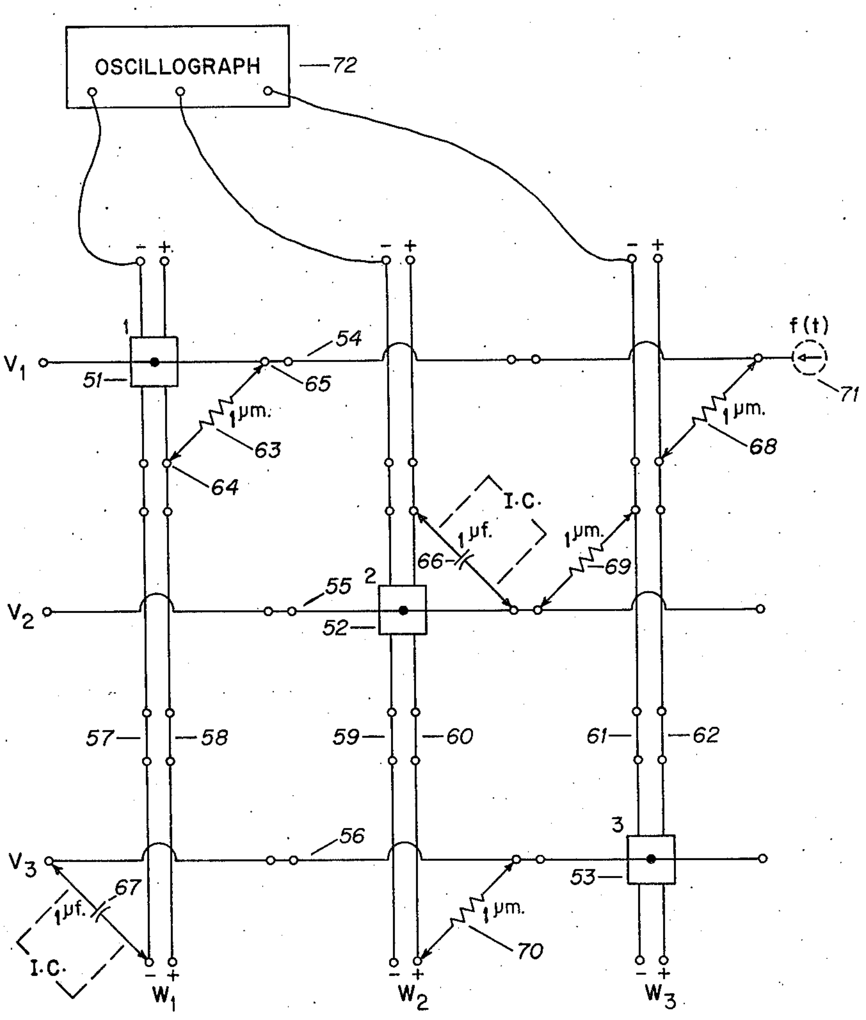
Figure 4:
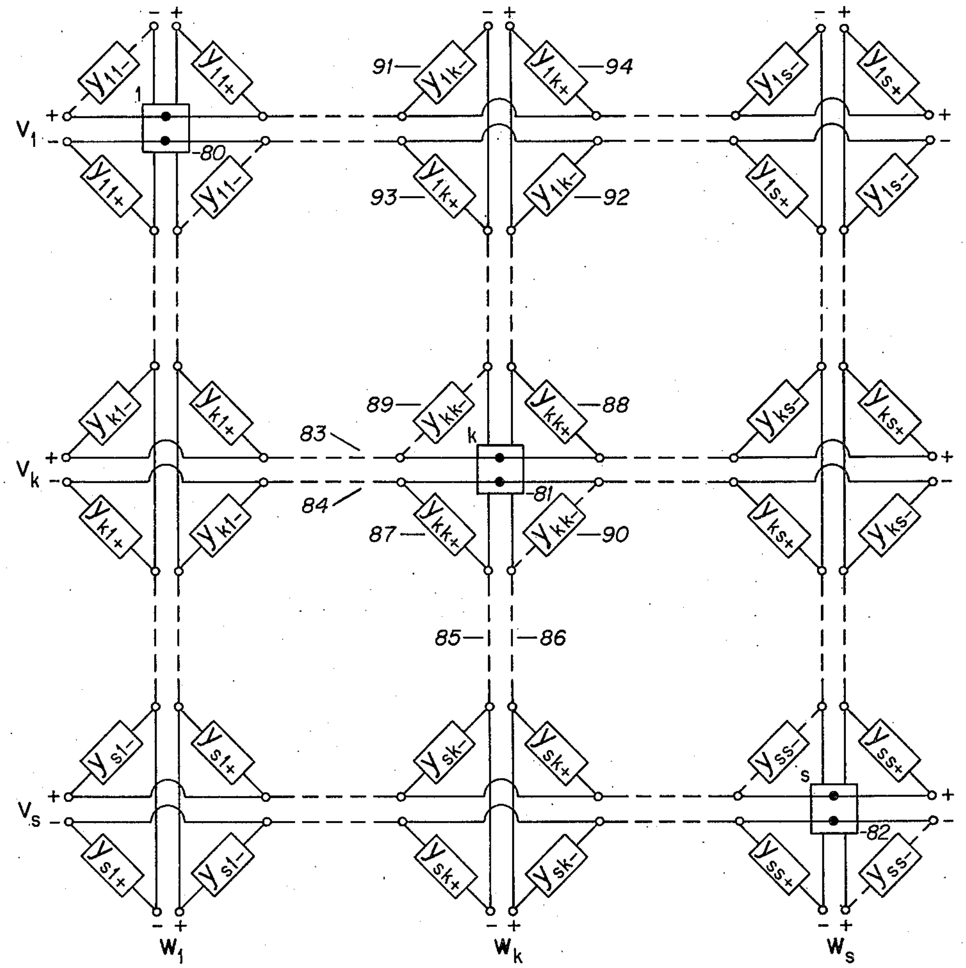

In the drawings accompanying this specification,

FIG. 1 illustrates the basic synthesis network,

FIG. 2 is an ideograph of an ensemble of basic synthesis networks for the electric synthesis of a $(s \times s)$ order mathematical matrix, FIG. 3 is a combination ideograph for the solution of the differential equation $(1+d^2)x=f(t)$, *and* the arrangement of a physical embodiment of the electric synthesizer in its most elemental form, FIG. 4 is an ideograph of a balanced-to-reference, or electrically symmetrical, version of the electric matrix synthesizer for a $(s \times s)$ order mathematical matrix equation.

Mathematical matrices have in general a number of entries arranged in rows and columns. Thus the matrix $B_1$ can be written $$[B_1]=\begin{bmatrix} b_{11}, b_{12}, b_{13}, b_{14}, b_{15} \\ b_{21}, b_{22}, b_{23}, b_{24}, b_{25} \\ b_{31}, b_{32}, b_{33}, b_{34}, b_{35} \\ b_{41}, b_{42}, b_{43}, b_{44}, b_{45} \end{bmatrix}$$

The first number of the subscript of "$b$" locates the row and the second number of the subscript the column of each entry.

Each entry may be more than a single number. Each entry can itself contain several elements and the entries themselves may be complicated terms and even matrices. Thus a matrix of matrices would be possible.

An entry may be differential or integral in nature. The entries themselves may be fixed or variable unknown quantities or they may be prescribed quantities which are either given constants or given functions according to the usual mathematical rules.

The fundamental theory of the electric synthesizer is based upon an ensemble of the basic synthesis network shown in FIG. 1, and employs a combination of a suitable amplifying device comprising primitive active trinodes or quadrinodes (such as electron-tubes, transistors, or rotating amplifiers, and the like) and dinode network elements (such as capacitances, inductances, or conductances) or their combinations into synthetic higher-order subnetworks, for the synthesis of one column of a mathematical matrix. The amplifying means 11, FIG. 1, ideally enjoys the following attributes: zero input admittance and zero output impedance, voltage amplification $\mu$, bipolarity outputs and inputs in a balanced-to-reference-node. This is node 10 explicitly shown in FIG. 1, and, as is common practice in the electronic art, understood to be present in all other figures, although not drawn in FIGS. 2, 3 and 4. In the simplest version, the amplifying means 11 has a unipolar input 19 and bipolarity outputs 21 and 22, all with respect to the reference node 10.

FIG. 1 represents the synthesis of the $k$th column of a $(s \times s)$ order mathematical matrix; this is accomplished by the amplifying means 11 with its input connected to the $k$th row 19 of the synthesis network, and its output of bipolarity 21 and 22 connected to the $k$th column, together with suitable self and mutual admittances. The non-diagonal entries of the mathematical matrix are represented in this elementary example by the dinode admittances 14, 15 and 16, 17. The total number of such mutual coupling elements depends upon the order of the matrix and the number of finite entries in its $k$th column. The diagonal term or $k$, $k$th entry of the mathematical matrix is represented by the dinode admittances (or combinations of dinodes) represented by 12 and 13.

An ensemble of these synthesis networks with the addition of suitable prescribed current sources corresponding to the prescribed known vector column in the mathematical matrix equation then completes the electric synthesis of the given mathematical matrix equation.

The term current-source is used in its strictest technical sense, namely that it will furnish substantially constant or functionally time-varying current at any prescribed value regardless of the terminating load admittance. On the other hand, a voltage-source supplies substantially constant or functionally time-varying voltage regardless of the load impedance. It should be understood in both cases that the loads are within normal physical limits. A storage battery, a dry cell, a shunt D.C. generator, an electronic signal generator or audio oscillator are all examples of voltage-sources. Each has an internal electromotive force and an internal resistance. Current-sources are less familiar but some classical examples are the Van de Graaff generator and the constant-current arc lighting generator. Currently there are electronic (constant) current-sources available. It should be noted that a voltage-source should not be short-circuited since the current will rise to abnormal heights, while on the contrary a current-source should not be open-circuited or the voltage will rise to abnormal heights.

The theory of the method of this invention is most elegantly presented by a mathematical formulation such as briefly follows. The generalized electric admittance of the network shown in FIG. 1, with symmetric coordinates as indicated and the common reference node 10 as indicated by the grounding symbol, reads $$[y]=\begin{bmatrix} 0 & . & 0 & (y_{1k+}-y_{1k-})\mu_k & 0 & . & 0 \\ 0 & . & 0 & (y_{2k+}-y_{2k-})\mu_k & 0 & . & 0 \\ \cdots & & & \cdots & & & \cdots \\ 0 & . & 0 & (y_{kk+}-y_{kk-})\mu_k & 0 & . & 0 \\ \cdots & & & \cdots & & & \cdots \\ 0 & . & 0 & (y_{rk+}-y_{rk-})\mu_k & 0 & . & 0 \\ 0 & . & 0 & (y_{sk+}-y_{sk-})\mu_k & 0 & . & 0 \end{bmatrix}+\begin{bmatrix} (y_{1k+}+y_{1k-}) & . & 0 & . & 0 \\ 0 & . & 0 & . & 0 \\ . & . & . & . & . \\ 0 & . & (y_{kk+}+y_{kk-}) & . & 0 \\ . & . & . & . & . \\ 0 & . & 0 & . & 0 \\ 0 & . & 0 & . & (y_{sk+}+y_{sk-}) \end{bmatrix} \qquad (1)$$

in which the admittances, $y_{rk}=y_{rk}(d)$, are functions of differential coefficients $d=d/dt$ to the zero and integral powers. The first part of the right-hand side of Equation 1 is called the ideal synthesis matrix because it will be placed in 1-to-1 reciprocal correspondence with the mathematical matrix problem, after a transformation. The second part of the right-hand side of Equation 1 is called the network error matrix; this is of diagonal form and represents an approximation error in the electric synthesizer which can, however, be reduced to as small a magnitude as desired by increasing the magnitude of the voltage amplification $\mu_k$ as will be shown. Additional matrix terms indicating errors due to the approximations of ideal current sources by equivalent voltage sources and series impedances (true intrinsic current sources are not available in the present electronic art), and errors due to parasitic parameters in the physical network, may also be important. These terms likewise can be reduced in magnitude to the desired degree, as will be shown.

The generalized admittance equation of the ensemble of basic synthesis columns, such as those corresponding to a $(s\times s)$ order mathematical matrix, therefore reads $$([^1y]+[^2y]+[^3y]+[^4y])\cdot\begin{bmatrix} v_1 \\ v_2 \\ . \\ v_k \\ . \\ v_r \\ v_s \end{bmatrix}=\begin{bmatrix} j_1' \\ j_2' \\ . \\ j_k' \\ . \\ j_r' \\ j_s' \end{bmatrix} \qquad (2)$$

In Equation 2, the ideal synthesis matrix now is $$[^1y]=\begin{bmatrix} (y_{11+}-y_{11-})\mu_1 & .. & (y_{1k+}-y_{1k-})\mu_k & .. & (y_{1s+}-y_{1s-})\mu_s \\ (y_{21+}-y_{21-})\mu_1 & .. & (y_{2k+}-y_{2k-})\mu_k & .. & (y_{2s+}-y_{2s-})\mu_s \\ . & .. & . & .. & . \\ (y_{k1+}-y_{k1-})\mu_1 & .. & (y_{kk+}-y_{kk-})\mu_k & .. & (y_{ks+}-y_{ks-})\mu_s \\ . & .. & . & .. & . \\ (y_{r1+}-y_{r1-})\mu_1 & .. & (y_{rk+}-y_{rk-})\mu_k & .. & (y_{rs+}-y_{rs-})\mu_s \\ (y_{s1+}-y_{s1-})\mu_1 & .. & (y_{sk+}-y_{sk-})\mu_k & .. & (y_{ss+}-y_{ss-})\mu_s \end{bmatrix} \qquad (3)$$

and the network error matrix reads $$[^2y]=\begin{bmatrix} \sum_{i=1}^{s}(y_{1i+}+y_{1i-}) & . & 0 & . & 0 \\ 0 & . & 0 & . & 0 \\ . & . & . & . & . \\ 0 & . & \sum_{i=1}^{s}(y_{ki+}+y_{ki-}) & . & 0 \\ . & . & . & . & . \\ 0 & . & 0 & . & 0 \\ 0 & . & 0 & . & \sum_{i=1}^{s}(y_{si+}+y_{si-}) \end{bmatrix} \qquad (4)$$

The equivalent source error matrix $[^3y]$ and the parasitic error matrix $[^4y]$ may or may not be significant, depending upon the magnitudes of the particular problem, but can be made as small as desired, as will be shown. Finally, the right-hand column vector of $j'$:s in Equation 2 represents the current-source equivalents actually constructed from intrinsic voltage sources and series impedances.

Applying to Equation 2 the transformation $$[v]=C[-w] \qquad (5)$$

where $$C=\begin{bmatrix} \frac{1}{\mu_1} & 0 & . & 0 & . & 0 & 0 \\ 0 & \frac{1}{\mu_2} & . & 0 & . & 0 & 0 \\ . & . & . & . & . & . & . \\ 0 & 0 & . & \frac{1}{\mu_k} & . & 0 & 0 \\ . & . & . & . & . & . & . \\ 0 & 0 & . & 0 & . & \frac{1}{\mu_r} & 0 \\ 0 & 0 & . & 0 & . & 0 & \frac{1}{\mu_s} \end{bmatrix} \qquad (6)$$

and the vectors $[v]$ and $[-w]$ are defined in FIG. 1, results in the expression $$([^0y]+[^2y]C+[^3y]C+[^4y]C)\cdot\begin{bmatrix} -w_1 \\ -w_2 \\ . \\ -w_k \\ . \\ -w_r \\ -w_s \end{bmatrix}=\begin{bmatrix} j_1' \\ j_2' \\ . \\ j_k' \\ . \\ j_r' \\ j_s' \end{bmatrix} \qquad (7)$$

It should be noted that the $-w$:s represent the voltage outputs of the amplifying means, from which readings are obtained of the solutions.

In Equation 7, the term $$[^0y]=[^1y]C \qquad (8)$$

which can now be made to correspond exactly to the mathematical problem matrix, reads $$[{}^0\mathrm{y}]=\begin{bmatrix}(y_{11+}-y_{11-}) & \ldots & (y_{1k+}-y_{1k-}) & \ldots & (y_{1s+}-y_{1s-})\\ (y_{21+}-y_{21-}) & \ldots & (y_{2k+}-y_{2k-}) & \ldots & (y_{2s+}-y_{2s-})\\ \cdot & \ldots & \cdot & \ldots & \cdot\\ (y_{k1+}-y_{k1-}) & \ldots & (y_{kk+}-y_{kk-}) & \ldots & (y_{ks+}-y_{ks-})\\ \cdot & \ldots & \cdot & \ldots & \cdot\\ (y_{r1+}-y_{r1-}) & \ldots & (y_{rk+}-y_{rk-}) & \ldots & (y_{rs+}-y_{rs-})\\ (y_{s1+}-y_{s1-}) & \ldots & (y_{sk+}-y_{sk-}) & \ldots & (y_{ss+}-y_{ss-})\end{bmatrix} \quad (9)$$

and no longer exhibits the various gains of the amplifying means (the $\mu$:$s$). Likewise the entries in the matrices $[{}^2\mathrm{y}]\cdot C$, $[{}^3\mathrm{y}]\cdot C$, and $[{}^4\mathrm{y}]\cdot C$ may be made as small as desired, by making the respective $\mu$:$s$ sufficiently large. (Certain stability aspects of the electric synthesis network depend upon the frequency response of the amplifying means. This is not discussed in the specification. Reference is therefore made to the bibliography.)

The electric synthesis network, to the degree of approximation desired as is true of all physical devices, is then prescribed by the matrix admittance equation $$[{}^0\mathrm{y}]\cdot[-w]=[j'] \quad (10)$$

which is now in the desired form and homeomorphic, entry per entry, to a purely mathematical matrix equation, with the latter completely arbitrary.

FIG. 2 is an ideograph of the synthesis matrix $[{}^0\mathrm{y}]$ of Equation 10, that is, an ensemble of the single column synthesis network illustrated in FIG. 1. In FIG. 2, showing the ideograph of the complete electric synthesis of a ($s\times s$) order matrix equation, the $k$th column 21, 22 is the same as that shown by 21, 22 in FIG. 1; similarly, 11 the amplifying means $\mu_k$ in FIG. 1 is also represented in FIG. 2 by the square symbol 11. Furthermore, the input node 19 on row $k$, and 21, 22 the outputs $-w_k$, $+w_k$ on the $k$th column are identical in FIG. 1 and FIG. 2. The remaining columns in the ensemble shown in FIG. 2, such as the 1st and $s$th, are similarly indicated by the appropriate basic synthesis columns 23, 24 and 25, 26 respectively. Each column has its amplifying means on the principal diagonal, such as 27 on column 1, and 28 on column $s$, respectively.

It should be noted that the ideograph in FIG. 2 *also* represents symbolically the physical arrangement which can be employed in the physical embodiment of the electric synthesizer, such that the individual electric subnetworks are arranged to be topologically isomorphic to the mathematical matrix being synthesized. This is then an orderly arrangement, in which each entry of the mathematical matrix, such as the 1, $k$ entry for example is represented by one and only one electric subnetwork 15 or $y_{1k-}$ if the algebraic sign of the mathematical 1, $k$ entry is negative; or by the subnetwork 14 or $y_{1k+}$ if the sign of the mathematical 1, $k$ entry is positive. And similarly for all the other mathematical entries and their corresponding subnetwork entries in the electric synthesizer. (Special methods, employing both positive and negative term admittances $y_{1k+}$ and $y_{1k-}$ simultaneously are shown in FIGS. 1, 2 and 4 but, the effect of such synthesis methods upon the relative magnitudes of the terms in Equation 7 are not discussed in the above paragraph.

By this topological isomorphism, the 1-to-1 correspondence between the mathematical matrix equations and the physical embodiment is emphasized. This is a particularly useful feature in practice when the electric synthesizer is utilized for the solution of complicated mathematical problems, such as systems of differential equations. The orderly arrangement and the isomorphism has the advantages of requiring a minimum of set-up time; greater ease in checking the actual synthesis; and is of inestimable value when the mathematical problem is under continuous transformation, a procedure often demanded in practical applications.

This new method of electric network synthesis may become better understood by an illustration, such as its application to a simple differential equation. It will become clear that similar considerations apply also to the synthesis of matrix systems of algebraic equations, so that the latter need not be considered separately in this specification.

Programming a system of differential equations, which can be represented compactly by $$(A_1D^0+A_2D+\ldots+A_nD^{n-1}+A_{n+1}D^n)x=f(t) \quad (11)$$

where $D^n=I\cdot d^n$ and $D^0=I$ $d^n$ is written for $d^n/dt^n$

I is the $m$th order identity matrix $A_i$ is an $m$th order matrix of real constants with at least one non-zero element $x$ is a column matrix of $m$ dependent real functions of $t$, to be determined $f(t)$ is a column matrix of $m$th order with prescribed real functions of $t$ as elements $t$ is the independent real variable, in reality requires synthesizing a network corresponding to one of the infinite variety of first-order differential equation systems equivalent to Equation 11. For example, the first-order system $$\begin{bmatrix}A_1 & A_2 & A_3\ldots A_n & A_{n+1}\\ -D & \mathrm{I} & 0\ldots 0 & 0\\ \cdot & \cdot & \cdot\ldots\cdot & \cdot\\ 0 & 0 & 0\ldots \mathrm{I} & 0\\ 0 & 0 & 0\ldots -D & \mathrm{I}\end{bmatrix}\begin{bmatrix}x_1\\ x_2\\ \cdot\\ x_n\\ x_{n+1}\end{bmatrix}=\begin{bmatrix}f(t)\\ 0\\ \cdot\\ 0\\ 0\end{bmatrix} \quad (12)$$

in which $$x_i=D^{i-1}x, \qquad i=1, \ldots, n, n+1$$

yields the solutions to the given problem, Equation 11, a mathematical system in $m$ variables, with at least one of the equations of the $n$th order.

As the elementary illustrative mathematical problem, consider the programming of the differential equation $$(1+d^2)x=f(t) \quad (13)$$

which is representable, according to an interesting transformation of the programming scheme Equation 12, by the mathematical matrix equation $$\begin{bmatrix}1 & 0 & 1\\ 0 & d & -1\\ -d & 1 & 0\end{bmatrix}\begin{bmatrix}x_1\\ x_2\\ x_3\end{bmatrix}=\begin{bmatrix}f(t)\\ 0\\ 0\end{bmatrix} \quad (14)$$

The electric synthesis network, according to Equation 10, corresponding to the mathematical matrix problem Equation 14 will then read $$\begin{bmatrix}g_{11} & 0 & g_{13}\\ 0 & c_{22}d & -g_{23}\\ -c_{31}d & g_{32} & 0\end{bmatrix}\begin{bmatrix}-w_1\\ -w_2\\ -w_3\end{bmatrix}=\begin{bmatrix}j_1'\\ 0\\ 0\end{bmatrix} \quad (15)$$

in which the $c$:$s$ are capacitances and the $g$:$s$ are conductances located in the synthesis network according to the ordering subscripts of the two matrix systems, the mathematic and the electric. The numerical coefficients of the electric network parameters depend upon the problem matrix Equation 14. Multiplying the latter by an arbitrary constant such as $10^{-6}$ yields a network synthesis admittance matrix reading $$\begin{bmatrix}10^{-6} & 0 & 10^{-6}\\ 0 & 10^{-6}d & -10^{-6}\\ -10^{-6}d & 10^{-6} & 0\end{bmatrix}\begin{bmatrix}-w_1\\ -w_2\\ -w_3\end{bmatrix}=\begin{bmatrix}10^{-6}f(t)\\ 0\\ 0\end{bmatrix} \quad (16)$$

The electric synthesis of Equation 16 is indicated by FIG. 3, which shows a mechanical arrangement for a synthesis panel topologically isomorphic to the matrix problem Equation 14.

In FIG. 3, the conductance 63 represents the positive self-admittance $y_{11}=1$ micromho, 68 represents the mutual admittance $y_{13}=1$ micromho, 66 represents the self-admittance $y_{22}=1$ microfarad capacitance, 69 the mutual admittance $-y_{23}=1$ micromho, 67 the mutual admittance $-y_{31}=1$ microfarad capacitance, and 70 the mutual admittance $y_{32}=1$ micromho. All other admittances are zero magnitude, corresponding to the numerical zero entries of Equation 14, including the zero entry on the principal diagonal of this mathematical matrix.

The admittances comprising the subnetworks are arranged to be plugged into an arrangement of jacks, such as 64, 65 into which the network 63 is plugged; and similarly for all other finite admittance subnetwork elements (or their combinations in more involved problems). The intrinsic current source 71 is $j_1'=10^{-6}f(t)$ amperes, where $f(t)$ is the mathematical expression prescribing the function in Equations 13 and 14. Initial conditions of the differential equation, if other than zero, are set into the synthesizer network by appropriate charges of the capacitances 66, 67.

Finally, the solution to the mathematical problem Equation 13 is displayed by the oscillograph 72, or other measuring or recording means, in which 57 or $-w_1$, 59 or $-w_2$, and 61 or $-w_3$ respectively in volts indicate $x$, $dx$, and $d^2x$, the solution, as well as the first and second derivatives thereof, of the differential Equation 13.

It is well known that amplifying means with balanced-to-reference-node for both input and output have certain desirable attributes: these include greater range of input and output voltages with lessened distortion, particularly less even harmonic distortion components for cissoidal inputs; reduction in the stringency on low internal impedance and hum level in supply and biasing potentials or currents; halving of the effect of residual parasitic parameters, such as stray capacitances, and the like. FIG. 4 is an ideograph of the electric synthesizer of mathematical matrix equations which enjoys these desirable attributes of balanced-to-reference amplifying means.

In FIG. 4, the 1st, $k$th and $s$th columns are similar to the 1st, $k$th and $s$th columns of FIG. 2, except that the synthesizer in FIG. 4 has amplifying means 80, 81, and 82 with both balanced-to-reference *inputs* as well as outputs on the (1, 1), ($k$, $k$) and ($s$, $s$) entries as well as on all the remaining principal diagonal entries. Each row, such as the $k$th, of the synthesis network in FIG. 4 consists of a pair of input electric connections such as 83, 84; and similarly each column, such as the $k$th, has a pair of output electric connections such as 85, 86. The self-admittance terms in the synthesis matrix Equation 10 now comprise a pair 89, 90 of admittance subnetworks $y_{kk-}$, or 87, 88 subnetworks $y_{kk+}$. Similarly, 91, 92 are the mutual admittance subnetworks $y_{1k-}$ if of negative sign; or 93, 94 subnetworks $y_{1k+}$ if of positive sign. Naturally, the intrinsic current sources, or their equivalents, representing the prescribed functions of time, the vector $j_i'$ of Equation 10, are now also of balanced-to-reference-node type. Initial conditions (for differential equations) are injected on pairs of capacitances, as appropriate. Finally, the displays of the solution to a mathematical matrix problem are obtained from pairs of output terminals in a balanced arrangement, such as from 85, 86 for $w_k$ on column $k$, and so forth.

This version of the means for the electric synthesis of mathematical matrix equations so briefly described is clearly understandable from the ideograph in FIG. 4 and is a logical improvement of the other means set forth above in this specification. It is furthermore understood that the ideograph FIG. 4 also illustrates an elementary form of physical means with a topological configuration which is isomorphic to a mathematical matrix equation, as is the case for the simpler versions of the device.

Although not shown in the figures attached to this specification nor derived in detail, it is clear that the transpose of Equation 10, which would read $$[-w]_t \cdot [{}^0y]_t = [j']_t \qquad (17)$$

in which the subscript $t$ implies the transpose of the corresponding matrix and vectors in Equation 10 may similarly be electrically synthesized by employing a basic *row* synthesis network. That is, an electric network which is the transpose of the network shown in FIG. 1 such that 21, 22 or column $k$ would become row $k$; while 18, 19 and 20, the rows 1, $k$ and $s$ in FIG. 1 would become columns 1, $k$ and $s$, respectively. An ensemble of such row synthesis networks, one for each row of Equation 17 would then correspond 1-to-1 reciprocally to a mathematical matrix problem homeomorphic to Equation 17. The transpose of FIG. 2, FIG. 3 and FIG. 4 are likewise to be interpreted, whether as ideographs or as means isomorphic to Equation 17.

Another important consideration not previously mentioned so as to simplify the discussion up to this point, but to be understood as bearing on all statements in this specification, concerns the nature of the subnetworks, such as 12, 13, 14, 15, and 16 in FIG. 1 and FIG. 2; or 87, 88, 89, 90, 91, 92, 93, and 94 in FIG. 4; and the remaining subnetworks shown and implied in the specification and drawings. These subnetworks need not be fixed, constant, unvarying electric parameters such as shown in the example FIG. 3. The subnetworks may actually have the attribute that their electric magnitudes are functions of the independent time variable $t$, in which case the electric synthesizer network may represent a linear equation with time-varying coefficients such as a linear differential equation with variable coefficients. Or, the subnetwork parameters may be functions of the dependent variable or variables, in which case the electric synthesizer corresponds to a non-linear matrix equation system.

It is manifestly impossible to consider all the desirable attributes of this new invention, permitting as it does the application of the full power and rigor of matrix mathematical methods to the electric synthesis networks. Reference to additional results of our researches on this new invention, including numerous examples of the synthesis of differential equation systems; considerations of matrix transformations of the mathematical equations by both matrix premultipliers and postmultipliers; change of scale of the dependent and independent variables; considerations of stability (all-important in these networks); and other topics as well as a description of one reduction to practice of the invention, may be found in the following bibliographical references:

"Matrices in Analogue Mathematical Machines," Pierre M. Honnell and Robert E. Horn, Journal of the Franklin Institute, Philadelphia, Pa., vol. 260, No. 3, September 1955, pp. 193–207.

"Matrices in Analogue Computers," Robert E. Horn. Dissertation, Washington University, St. Louis 5, Missouri. June 1955.

"Matrices in Electronic Differential Analyzers," Pierre M. Honnel and Robert E. Horn. Proceedings, International Analogy Computation meeting, Bruxelles, Belgium, September 26–October 2, 1955, pp. 217–221.

"Analogue Computer Synthesis and Error Matrices," Pierre M. Honnell and Robert E. Horn. Communications and Electronics, American Institute of Electrical Engineers, New York 33, N.Y., No. 23, March 1956, pp. 26–32.

"Electronic Network Synthesis of Linear Algebraic Matrix Equations," Robert E. Horn and Pierre M. Honnell, Communications and Electronics, American Institute of Electrical Engineers Transactions, number 46, January 1960, pp. 1028–1032.

In conclusion, this invention with its solid theoretical foundation and rational physical embodiment, is in sharp contrast to the prior and existing art which is entirely lacking in generality and consists principally of stereotyped procedures and means.

What is claimed is:

1. Apparatus for simulating matrix equations having an ordered array of rows and columns of entries including a column of dependent variables to be determined and a column of known prescribed quantities, comprising a plurality of amplifiers each of said amplifiers having an input and output, a plurality of electric network admittance components, having only two access terminals, representing the entries in the matrix with the values of the admittance components corresponding to the mathematical matrix entries, said admittance components representing the entries of the first row of the matrix having one terminal connected to the input of the first amplifier, and the components representing the entries of the second row of the matrix having one terminal connected to the input of the second amplifier, and so on, said components representing the entries of the last row of the matrix being connected to the input of the last amplifier, the other terminal of said components representing the entries in the first column of the matrix being connected to the output of the first amplifier, the other terminal of said components representing the entries in the second column being connected to the output of the second amplifier, and so on, the other terminal of the components representing the entries in the last column being connected to the output of the last amplifier, a plurality of current sources corresponding to the prescribed quantities in the matrix equation, the current source corresponding to the first entry in the column of prescribed quantities being connected to the input of the first amplifier, the current source corresponding to the second entry in the column of prescribed quantities being connected to the input of the second amplifier, and so on, the current source representing the last prescribed quantity being connected to the input of the last amplifier, a plurality of translating devices adapted to respond to the outputs of the amplifiers being connected to the outputs of the amplifiers.

2. Apparatus for simulating matrix equations having an ordered array of rows and columns of entries including a column of dependent variables to be determined and a column of known prescribed functions, comprising a plurality of amplifiers each of said amplifiers having an input and output and common terminal, a plurality of two-terminal electric network admittance components representing all the entries in the matrix with the values and type of the electric network admittance components corresponding to the numerical magnitude and mathematical type of matrix entries, said electric network admittance components representing the entries of the first row of the matrix having one terminal connected to the input of the first amplifier and the said components representing the entries of the second row of the matrix having one terminal connected to the input of the second amplifier, and so on, said components representing the entries of the last row of the matrix being connected to the input of the last amplifier, the other terminal of said electric network components representing the entries in the first column of the matrix being connected to the output of the first amplifier, the other terminal of said components representing the entries in the second matrix column being connected to the output of the second amplifier, and so on, the other terminal of the components representing the entries in the last matrix column being connected to the output of the last amplifier, a plurality of electric energy sources adapted to be momentarily connected to energize those electric network components corresponding to the differential and integral entries of the mathematical matrix to the extent determined by the initial conditions imposed by the mathematical problem the matrix equation represents, a plurality of current sources with an output current corresponding in magnitude and type to the numerical values and mathematical type of the prescribed functions in the matrix equation, one terminal of the current source corresponding to the first entry in the column of prescribed functions being connected to the input of the first amplifier, one terminal of the current source corresponding to the second entry in the column of prescribed functions being connected to the input of the second amplifier, and so on, one terminal of the current source representing the last prescribed function being connected to the input of the last amplifier, a plurality of translating devices being adapted to respond to the outputs of the amplifiers with one terminal connected to the output of each amplifier, and a common connection being provided between the other terminal of each current source, the common terminals of each of the amplifiers and the other terminal of each of the translating devices.

3. Apparatus for simulating matrix equations having an ordered array of rows and columns of entries including a column of dependent variables to be determined and a column of known prescribed functions, comprising a plurality of bipolar input and output balanced amplifiers each of said amplifiers having two input and two output terminals, a plurality of pairs of identical two-terminal electric network admittance components representing the entries in the matrix with the values and type of the pairs of identical electric network components corresponding to the numerical magnitude and mathematical type of matrix entries, said pairs of electric network components representing the entries in the first row of the matrix having one terminal of each pair respectively connected to one of the balanced inputs of the first amplifier and the said pairs of electric network components representing the entries of the second row of the matrix having one terminal of each pair respectively connected to one of the balanced inputs of the second amplifier, and so on, said pair of electric network components representing the entries of the last row of the matrix having one terminal respectively connected to one of the bipolar inputs of the last amplifier, the other terminals of said pairs of electric network components representing the entries in the first column of the matrix being respectively connected to the bipolar outputs of the first amplifier, the other terminals of said pairs of components representing the entries in the second matrix column being respectively connected to the bipolar outputs of the second amplifier, and so on, the other terminals of each of the pairs of electric network components representing the entries in the last matrix column being respectively connected to the bipolar outputs of the last amplifier, a plurality of electric energy sources adapted to be momentarily connected to energize the electric network components corresponding to the differential and integral entries of the mathematical matrix to the extent determined by the initial conditions imposed by the mathematical problem the matrix equation represents, a plurality of current sources with a current output corresponding in magnitude to the numerical value and type of prescribed function in the matrix equation, the terminals of the current source corresponding to the first entry in the column of prescribed functions being connected to the bipolar input of the first amplifier, the terminals of the current source corresponding to the second entry in the column of prescribed functions being connected to the bipolar input of the second amplifier, and so on, the terminals of the current source representing the last prescribed function being connected to the bipolar input of the last amplifier, a plurality of translating devices adapted to respond to the outputs of the amplifiers being connected to the bipolar outputs of each amplifier.

4. Apparatus for simulating and solving mathematical matrix equations having an ordered array of rows and columns of entries including a column of dependent variables to be determined and a column of known prescribed functions, comprising a plurality of bipolar balanced input and output amplifiers each of said amplifiers having two input and two output terminals, a plurality of pairs of identical two-terminal electric network components representing the entries in the matrix with the values and type of the pairs of identical electric network components corresponding to the numerical magnitude and mathematical type of matrix entries, fixed or variable, said pairs of electric network components representing the entries in the first row of the matrix having one terminal of each pair respectively connected to one of the balanced inputs of the first amplifier and the said pairs of electric network components representing the entries of the second row of the matrix having one terminal of each pair respectively connected to one of the balanced inputs of the second amplifier, and so on, said pairs of electric network components representing the entries of the last row of the matrix having one terminal respectively connected to one of the bipolar inputs of the last amplifier, the other terminals of said pairs of electric network components representing the entries in the first column of the matrix being respectively connected to the bipolar outputs of the first amplifier, the other terminals of said pairs of components representing the entries in the second matrix column being respectively connected to the bipolar outputs of the second amplifier, and so on, the other terminals of each of the pairs of electric network components representing the entries in the last matrix column being respectively connected to the bipolar outputs of the last amplifier, a plurality of electric current sources with a current output corresponding in magnitude to the numerical value and type of prescribed function in the matrix equation, the terminals of the current source corresponding to the first entry in the column of prescribed functions being connected to the bipolar input of the first amplifier, the terminals of the current source corresponding to the second entry in the column of prescribed functions being connected to the bipolar input of the second amplifier, and so on, the terminals of the current source representing the last prescribed function being connected to the bipolar input of the last amplifier, a plurality of translating devices being adapted to respond to the outputs of the amplifiers being connected to the bipolar outputs of each amplifier.

5. Apparatus for simulating and solving mathematical matrix equations having an ordered array of rows and columns of entries including a column of dependent variables to be determined and a column of known prescribed functions, comprising a plurality of bipolar balanced input and output amplifiers each of said amplifiers having two input and two output terminals, a plurality of groups of electrical components each group representing an entry in the matrix, each group comprising two pairs of electric components each pair being identical, the net algebraic value of each group corresponding to the fixed or variable magnitude of the matrix entries, said groups of electric components representing the entries of the first row of the matrix having one terminal of each identical pair connected to opposite polarity terminals of the balanced input of the first amplifier, and the said identical pairs of electric components in the groups representing the entries of the second row of the matrix having one terminal of each identical pair connected to opposite polarity terminals of the balanced input of the second amplifier, and so on, said identical pairs of electric components in the groups representing the entries of the last row of the matrix having one terminal of each identical pair connected to opposite polarity terminals of the balanced inputs of the last amplifier, the other terminals of said identical pairs of electric components of the groups representing the entries in the first column of the matrix being respectively connected to the opposite bipolar outputs of the first amplifier, the other terminals of said identical pairs of electric components of the groups representing the entries in the second matrix column being respectively connected to opposite bipolar outputs of the second amplifier, and so on, the other terminals of each of the identical pairs of electric components of the groups representing the entries in the last matrix column being respectively connected to opposite bipolar outputs of the last amplifier, a plurality of current sources with a current output corresponding to the numerical values of the prescribed functions in the matrix equation, the terminals of the current source corresponding to the first entry in the column of prescribed functions being connected to the bipolar input of the first amplifier, the terminals of the current source corresponding to the second entry in the column of prescribed functions being connected to the bipolar input of the second amplifier, and so on, the terminals of the current source representing the last prescribed function being connected to the bipolar input of the last amplifier, a plurality of translating devices being connected to the bipolar outputs of each amplifier.

6. Apparatus for simulating and solving mathematical matrix equations having an ordered array of rows and columns of entries including a column of dependent variables to be determined and a column of known prescribed functions, comprising a plurality of bipolar balanced input and output amplifiers each of said amplifiers having two input and two output terminals, a plurality of groups of electrical components each group representing an entry in the matrix, each group comprising two pairs of electric components each pair being identical, the net algebraic value of each group corresponding to the fixed or variable magnitude of the matrix entries, said groups of electric components representing the entries of the first row of the matrix having one terminal of each identical pair connected to opposite polarity terminals of the balanced input of the first amplifier, and the said identical pairs of electric components in the groups representing the entries of the second row of the matrix having one terminal of each identical pair connected to opposite polarity terminals of the balanced input of the second amplifier, and so on, said identical pairs of electric components in the groups representing the entries of the last row of the matrix having one terminal of each identical pair connected to opposite polarity terminals of the balanced inputs of the last amplifier, the other terminals of said identical pairs of electric components of the groups reperesenting the entries in the first column of the matrix being respectively connected to the opposite bipolar outputs of the first amplifier, the other terminals of said identical pairs of electric components of the groups representing the entries in the second matrix column being respectively connected to opposite bipolar outputs of the second amplifier, and so on, the other terminals of each of the identical pairs of electric components of the groups representing the entries in the last matrix column being respectively connected to opposite bipolar outputs of the last amplifier, a plurality of electric power sources adapted to be momentarily connected to energize the identical pairs of electric components of the groups corresponding to the differential and integral entries of the mathematical matrix to the extent determined by the initial conditions imposed by the mathematical problem the matrix equation represents, a plurality of current sources with a current output corresponding to the numerical values of the prescribed functions in the matrix equation, the terminals of the current cource corresponding to the first entry in the column of prescribed functions being connected to the bipolar input of the first amplifier, the terminals of the current source corresponding to the second entry in the column of prescribed functions being connected to the bipolar input of the second amplifier, and so on, the terminals of the current source representing the last prescribed function being connected to the bipolar input of the last amplifier, a plurality of translating devices being connected to the bipolar outputs of each amplifier.

7. Apparatus for simulating and solving mathematical matrix equations having an ordered array of rows and columns of entries including a column of dependent variables to be determined and a column of known prescribed functions, comprising a plurality of bipolar balanced input and output amplifiers each of said amplifiers having two input and two output terminals and a low input admittance and very high output admittance, a plurality of groups of electrical components each groups representing an entry in the matrix, each group comprising two pairs of electric components each pair being identical, the net generalized admittance value of each group corresponding to the fixed or variable magnitude of the matrix entries, said groups of electric components representing the entries of the first row of the matrix having one terminal of each identical pair connected to opposite polarity terminals of the balanced input of the first amplifier, and the said identical pairs of electric components in the groups representing the entries of the second row of the matrix having one terminal of each identical pair connected to opposite polarity terminals of the balanced input of the second amplifier, and so on, said identical pairs of electric components in the groups representing the entries of the last row of the matrix having one terminal of each identical pair connected to opposite polarity terminals of the balanced inputs of the last amplifier, the other terminals of said identical pairs of electric components of the groups representing the entries in the first column of the matrix being respectively connected to the opposite bipolar outputs of the first amplifier, the other terminals of said identical pairs of electric components of the groups representing the entries in the second matrix column being respectively connected to opposite bipolar outputs of the second amplifier, and so on, the other terminals of each of the identical pairs of electric components of the groups representing the entries in the last matrix column being respectively connected to opposite bipolar outputs of the last amplifier, a plurality of electric power sources adapted to be momentarily connected to energize the identical pairs of electric components of the groups corresponding to the differential and integral entries of the mathematical matrix to the extent determined by the initial conditions imposed by the mathematical problem the matrix equation represents, a plurality of current sources with a current output corresponding to the numerical values of the prescribed functions in the matrix equation, the terminals of the current source corresponding to the first entry in the column of prescribed functions being connected to the bipolar input of the first amplifier, the terminals of the current source correspnoding to the second entry in the column of prescribed functions being connected to the bipolar input of the second amplifier, and so on, the terminals of the current source representing the last prescribed function being connected to the bipolar input of the last amplifier, a plurality of translating devices being connected to the bipolar outputs of each amplifier.

8. Apparatus for simulating and solving mathematical matrix equations having an ordered array of rows and columns of entries including a column of dependent variables to be determined and a column of known prescribed functions, comprising a plurality of bipolar balanced output amplifiers each of said amplifiers having an input and a common terminal and two output terminals, a plurality of groups of electrical components each group representing an entry in the matrix, each group comprising two electric components with one joint and two independent terminals the net algebraic value of each group corresponding to the fixed or variable magnitude of the matrix entries, said groups of electric components representing the entries of the first row of the matrix having the joint terminal of each group connected to the input terminal of the first amplifier, and the said groups of electric components representing the entries of the second row of the matrix having the joint terminal of each group connected to the input terminal of the second amplifier, and so on, said groups of electric components representing the entries of the last row of the matrix having the joint terminal of each group connected to the input terminal of the last amplifier, the other terminals of said groups of electric components representing the entries in the first column of the matrix being respectively connected to the opposite bipolar outputs of the first amplifier, the other terminals of said groups of electric components representing the entries in the second matrix column being respectively connected to opposite bipolar outputs of the second amplifier, and so on, the other terminals of the groups of electric components representing the entries in the last matrix column being respectively connected to opposite bipolar outputs of the last amplifier, a plurality of current sources with a current output corresponding to the numerical values of the prescribed functions in the matrix equation, one terminal of the current source corresponding to the first entry in the column of prescribed functions being connected to the input terminal of the first amplifier, one terminal of the current source corresponding to the second entry in the column of prescribed functions being connected to the input terminal of the second amplifier, and so on, one terminal of the current source representing the last prescribed function being connected to the input terminal of the last amplifier, a plurality of translating devices being connected to the bipolar outputs of each amplifier, a common connection being provided between the other terminals of the prescribed current sources and the common terminals of the amplifiers.

9. Apparatus for simulating and solving mathematical matrix equations having an ordered array of rows and columns of entries including a column of dependent variables to be determined and a column of known prescribed functions, comprising a plurality of bipolar balanced output amplifiers each of said amplifiers having an input and a common terminal and two output terminals, a plurality of groups of electrical components each group representing an entry in the matrix, each group comprising two electrical components with one joint and two independent terminals the net generalized admittance value of each group corresponding to the fixed or variable magnitude of the matrix entries, said groups of electrical components representing the entries of the first row of the matrix having the joint terminal of each group connected to the input terminal of the first amplifier, and the said groups of electrical components representing the entries of the second row of the matrix having the joint terminal of each group connected to the input terminal of the second amplifier, and so on, said groups of electrical components representing the entries of the last row of the matrix having the joint terminal of each group connected to the input terminal of the last amplifier, the other terminals of said groups of electrical components representing the entries in the first column of the matrix being respectively connected to the opposite bipolar outputs of the first amplifier, the other terminal of said groups of electrical components representing the entries in the second matrix column being respectively connected to opposite bipolar outputs of the second amplifier, and so on, the other terminals of the groups of electrical components representing the entries in the last matrix column being respectively connected to opposite bipolar outputs of the last amplifier, a plurality of electric power sources adapted to be momentarily connected to energize the identical pairs of electrical components of the groups corresponding to the differential and integral entries of the mathematical matrix to the extent determined by the initial conditions imposed by the mathematical problem the matrix equation represents, a plurality of current sources with a current output corresponding to the numerical values of the prescribed functions in the matrix equation, one terminal of the current source corresponding to the first entry in the column of prescribed functions being connected to the input terminal of the first amplifier, one terminal of the current source corresponding to the second entry in the column of prescribed functions being connected to the input terminal of the second amplifier, and so on, one terminal of the current source representing the last prescribed function being connected to the input terminal of the last amplifier, a plurality of translating devices being connected to the bipolar outputs of each amplifier, a common connection being provided between the other terminals of the prescribed current sources and the common terminals of the amplifiers.

References Cited in the file of this patent

UNITED STATES PATENTS

| | | |
|---|---|---|
| 2,455,974 | Brown | Dec. 14, 1948 |
| 2,509,718 | Barbey | May 30, 1950 |
| 2,554,811 | Bromberg et al. | May 29, 1951 |
| 2,613,032 | Serrel et al. | Oct. 7, 1952 |
| 2,805,823 | Raymond et al. | Sept. 10, 1957 |

OTHER REFERENCES

Goldberg: R.C.A. Review, September 1948, volume IX, No. 3, pages 394–405.